United States Patent [19]

Julien

[11] 4,271,204
[45] Jun. 2, 1981

[54] SULFITE TREATMENT OF CHERRIES

[75] Inventor: Henri C. P. Julien, Vaucluse, France

[73] Assignee: APTUNION Union des Fabricants de Fruits Confits, Vaucluse, France

[21] Appl. No.: 65,624

[22] Filed: Aug. 10, 1979

[30] Foreign Application Priority Data

Aug. 30, 1978 [FR] France ................... 78 25572

[51] Int. Cl.³ .................. A23L 1/277; A23B 7/14
[52] U.S. Cl. .................................. 426/259; 426/271
[58] Field of Search ............... 426/270, 321, 333, 442, 426/253, 254, 424, 422, 495, 259, 615, 271

[56] References Cited
U.S. PATENT DOCUMENTS 2,494,257  1/1950  Nickol ................... 426/271
2,494,258  1/1950  Nickol ................... 426/442

OTHER PUBLICATIONS

Woodroof, J. G. & Luh, B. S. *Commercial Fruit Processing* 1975, pp. 95-97 and 430-434.

*Primary Examiner*—Joseph M. Golian
*Assistant Examiner*—Elizabeth J. Curtin
*Attorney, Agent, or Firm*—Karl F. Ross

[57] ABSTRACT

A method of preserving fruit, for example cherries, containing natural sugars which comprises storing the fruit in a sulfite brine for a substantial period whereby sugars of the fruit are leached into the brine, removing minerals, coloring and taste-embittering substances from the brine to form a sugar-containing liquor, and washing the fruit treated with the brine with the liquor so that during the washing the liquor and the fruit have substantially the same sugar levels.

3 Claims, 1 Drawing Figure

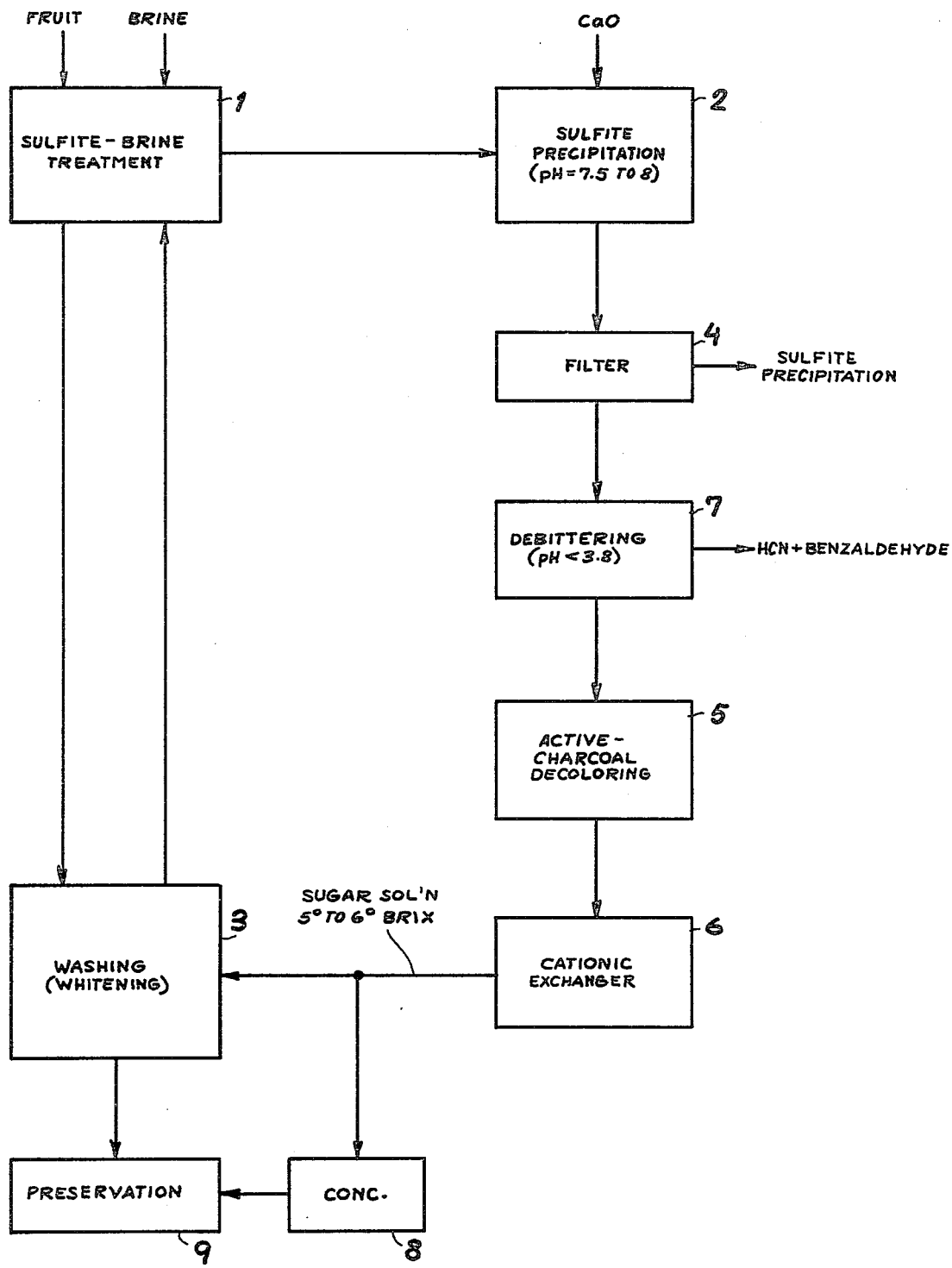

SULFITE TREATMENT OF CHERRIES

FIELD OF THE INVENTION

This invention relates to a process for treating fruit in order to both preserve the fruit and to prepare same for ultimate consumption.

BACKGROUND OF THE INVENTION

The prior-art processes used to preserve fruit and to treat the exterior of the fruit in preparation for ultimate consumption include a treating (storage) step in a salt solution (brine) containing sulfite enriched by various elements, especially calcium or aluminum. During the treatment which lasts 3 to 6 weeks, a state of equilibrium is established between the sugar content of the fruit and the salt solution containing the sulfite which results in a reduction of the fruit's sugar content (i.e. dextrose, levulose, sucrose or saccharose and a proportionate increase in the sugar content of the brine containing the sulfite.

Therefore, it is common that the fruit in contact with the brine has an initial sugar content of 10° to 12° Brix and a final content of 5° to 6° Brix.

The fruit is then separated from the sulfite brine which is discarded. The fruit is then subjected to a so-called "bleaching" or "whitening" operation which involves several washings in order to eliminate soluble substances from the fruit which are impregnated therein such as mineral salts, phenols etc. This whitening treatment which is carried out in pure water nevertheless has several inconveniences. One of the disadvantages is that it consumes a great deal of water as it is necessary to use up to seven times the volume of water as fruit. Furthermore this treatment contributes to the problem of water pollution because it is necessary to throw away a large part of the wash water. An additional problem is that the washing operation not only removes all of the undesirable substances in the fruit that has been removed from the salt solution containing the sulfite. The principal problem with the prior-art processes, however, is that the washing process can remove practically all of the remaining sugar content of the fruit. For example the fruit having undergone the preliminary treatment in a salt containing sulfite has a sugar content of 5° to 6° Brix. Upon leaving the washing operation, however, the sugar content of the fruit is practically zero. Such a loss in sugar must be compensated for by an imput of the equivalent amount of lost sugar upon preservation.

OBJECTS OF THE INVENTION

It is an object of the invention to eliminate the prior-art inconvenience mentioned hereinabove.

It is a further object of the invention to ensure a sugar content in the finally treated fruit (after whitening) corresponding to that present in the fruit prior to the whitening process.

SUMMARY OF THE INVENTION

According to the invention, after the fruit has undergone treatment with the brine containing sulfite and has been removed from the salt solution (see French Pat. No. 74 20 257), the salt solution rather than being discarded is recovered. The salt solution containing the sulfite ion is then subjected to a precipitation to remove the sulfite. The sulfite precipitation is then separated from the remaining salt solution usually by filtration. As the reagent for removing the sulfite any reagent capable of precipitating out sulfite ion may be employed. Preferred reagents for precipitating the sulfite include calcium compounds (e.g. calcium oxide).

After the sulfite ion has formed a precipitate and has been removed from the salt solution, which retains many of the natural sugars reached from the fruit, the selection is subjected to a so-called "debittering" step in order to decompose the amygdalosides such as amygdalin or Laetrile present therein. The amygdalin, present initially in the fruit stone and during the initial treatment of the fruit with the sulfite-containing solution, is passed from the fruit into the salt solution in addition to the natural sugars. The amygdalin must be decomposed because this compound imparts an extremely bitter, unpleasant taste to the liquor.

The debittering process is carried out in acid solution. During the acid hydrolysis the amygdalin is actually decomposed. Preferably the acid hydrolysis is effected at a pH less than 3.8.

Any conventional mineral acid or organic acid will serve to carry out the acid hydrolysis (e.g. hydrochloric acid, sulfuric acid, nitric acid, oxalic acid).

After undergoing acid hydrolysis the salt solution is then decolorized. The color of the solution before this step is generally brownish. The brownish color is due primarily to phenols present in the salt solution. Passing the salt solution over a bed of activated charcoal will remove phenols from the salt solution.

The solution is then demineralized by passing same through a cationic exchange resin to remove mineral impurities. The cationic exchange resin is fortified with an acid.

The product obtained by the process outlined above is a purified sugar solution, easily reusable, and having a sugar content of 5° to 6° Brix.

According to a preferred feature of the invention the whitening operation is carried out with the aid of a portion of the sugar solution recovered after the precipitation treatment, debittering, and subsequent decoloration and demineralization of the salt solution containing sulfite. The sugar content of the purified sugar solution which is 5° to 6° Brix is approximately equal to the sugar concentration of the fruit after it has undergone the initial treatment with the salt solution containing the sulfite. As a result an equilibrium is established between the concentration of the sugar in the fruit and the concentration of the sugar in the purified sugar solution. This equilibrium ensures that a minimum sugar content will be present in the finally treated fruit preferably 5° to 6° Brix.

According to another preferred feature of the invention the sugar solution having been added to the water to whiten the fruit is then recycled to the salt solution containing sulfite to begin again the initial treatment of the fruit to remove excess sugar. Accordingly there is no waste product from such an operation which must be discarded where water pollution would result.

According to yet another preferred feature of the invention a remaining part of the purified sugar solution not added to the whitening step is concentrated to form a sugar syrup used to prepare the fruit for eventual consumption after the whitening process is completed. The concentrating of the sugar solution can be carried out by heating the solution up to a boil.

Since all washings of the fruit, subsequent to the brine treatment are carried out with a liquor having the sugar level of the fruit after brine treatment, the sugar equilibrium precludes leaching of additional sugars and maintains the desired sugar level to the final preservation (packaging) step.

Because the purified demineralized sugar juice is recycled to the washing steps the entire treatment, especially the whitening stages, can be carried out continuously.

BRIEF DESCRIPTION OF THE DRAWING

The above objects, features and advantages of the present invention will become readily apparent from the following description, reference being made to the sole FIGURE of the accompanying drawing which is a flow diagram showing the various stages of the new process.

SPECIFIC DESCRIPTION

Into a first vessel 1 is led a salt solution containing sulfite. The raw fruit to be treated is also added to the vessel 1. The fruit and salt solution remain in the vessel for about four weeks.

At the end of the four-week period the fruit is removed from the vessel 1 and is directed to vessel 3 containing a washing solution. At the same time the salt solution containing sulfite and now sugars is led from vessel 1 to vessel 2. To the salt solution in vessel 2 containing sulfite and sugars is added a reagent capable of precipitating out the sulfite present therein.

The contents of the vessel 2 are then filtered in filter 4 where a sulfite precipitate is left behind. The filtrate is then passed over a bed of activated charcoal 5 to remove phenols therefrom.

The filtrate is then passed through a cationic exchanger 6 charged with acid to remove minerals from the solution. Debittering (see below) is carried out at 7. The resulting purified sugar solution is then led to the washing solution in vessel 3 where the fruit is whitened. As soon as the whitening is completed, the fruit is removed from the vessel 3 and the washing solution containing spent sugar solution is recycled to vessel 1 to treat a new supply of fruit.

Sugar syrup is concentrated at 8 and used to preserve the fruit (as packaging syrup) at 9.

SPECIFIC EXAMPLE

The following example permits the best understanding of the invention without limiting the scope of the invention in any way.

White heart cherries containing sugars in the amount of 12° Brix are treated in a fashion known in the art with a salt solution containing sulfite. The treatment lasts four weeks. At the end of the treatment the cherries had a sugar content of 5° to 6° Brix. The cherries were then separated from the salt solution containing the sulfite. The cherries were then transferred directly to the whitening process described hereinabove. Meanwhile the sulfate salt solution was subjected to the following purification process:

calcium oxide was added to the salt solution containing the sulfite to precipitate out calcium sulfite. The calcium oxide was added to the solution to a pH of 7.5 to 8. The calcium sulfite precipitate was then removed from the salt solution by filtration.

The filtrate was then debittered at a pH of less than 3.8 by mineral acid hydrolysis (H Cl) of the amygdalin to produce a solution of benzaldehyde, glucose and hydrocyanic acid by decomposition; the solution is then boiled to drive off a heteroazeotropic vapor phase of benzaldehyde and water, entraining the HCN.

The resulting salt solution is then decolored by passing same over a bed of activated charcoal where removal of phenols is effected by adsorption. The phenols are responsible for the brownish color of the salt solution.

The salt solution is then demineralized by passing same through a highly acidic cationic exchange resin.

The purified sugar solution obtained at the end of the treatment has a sugar content of about 5° to 6° Brix, comparable to that of the cherries at the end of the initial treatment with the salt solution containing the sulfite. This solution is used to wash (whiten) the fruit.

An equilibrium is established at this point between the sugar in the fruit and the sugar in solution. The whitening operation involves several washings in order to eliminate soluble impurities in the fruit.

The whitening operation is carried out on a continuous basis; a portion of the purified sugar solution is led directly to the washing solution and the wash water left over after the whitening process is completed is recycled to the stage where initially the fruit is contacted with the salt solution containing sulfite.

The remaining portion of the sugar solution recovered at the end of the sulfite salt treatment is concentrated by heating the solution to 60° to 65° in order to yield a sugar syrup of 78° Brix which is then utilized as a sugar source for preparing the fruit treated according to the invention for ultimate consumption.

What I claimed is:

1. A method of preserving cherries, containing natural sugars, which comprises the steps of:
   (a) storing the cherries in a sulfite brine;
   (b) removing the cherries from the sulfite brine;
   (c) removing from the sulfite brine in sequential order sulfite, taste-embittering substances including amygdalin and coloring substances, and further removing minerals by passing the treated brine through a cationic exchange resin fortified with acid to result in a purified sugar solution;
   (d) washing the cherries resulting from step (b) with a first portion of the purified sugar solution so that during the washing the purified sugar solution and the cherries have substantially the same sugar level of 5° to 6° Brix; and
   (e) recycling the resulting sugar solution used in washing step (d) to the sulfite brine used to initially remove sugar from the cherries.

2. The method defined in claim 1, step (c), wherein the removed amygdalin is decomposed by acid hydrolysis at a pH less than 3.8.

3. The method defined in claim 1 further comprising the step of:
   (f) concentrating a remaining portion of said purified sugar solution to a high sugar level and packaging the cherries washed during step (d) therein.

* * * * *